(12) United States Patent
Picard

(10) Patent No.: US 11,176,842 B2
(45) Date of Patent: Nov. 16, 2021

(54) INFORMATION PROCESSING APPARATUS, METHOD AND NON-TRANSITORY COMPUTER-READABLE STORAGE MEDIUM

(71) Applicant: FUJITSU LIMITED, Kawasaki (JP)

(72) Inventor: Sébastien Picard, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 418 days.

(21) Appl. No.: 15/989,562

(22) Filed: May 25, 2018

(65) Prior Publication Data

US 2018/0350257 A1    Dec. 6, 2018

(30) Foreign Application Priority Data

May 31, 2017  (JP) .............................. JP2017-108752

(51) Int. Cl.
| | |
|---|---|
| *G09B 7/00* | (2006.01) |
| *G09B 7/12* | (2006.01) |
| *G06F 3/0482* | (2013.01) |
| *G06F 3/01* | (2006.01) |
| *G09B 7/02* | (2006.01) |

(52) U.S. Cl.
CPC .............. *G09B 7/12* (2013.01); *G06F 3/013* (2013.01); *G06F 3/0482* (2013.01); *G09B 7/02* (2013.01)

(58) Field of Classification Search
CPC ... G09B 7/00; G09B 7/04; G09B 7/08; G09B 7/12

See application file for complete search history.

(56) References Cited

U.S. PATENT DOCUMENTS

| | | | | |
|---|---|---|---|---|
| 6,648,651 | B1* | 11/2003 | Cadman ................... | G09B 7/06 434/322 |
| 2004/0014016 | A1* | 1/2004 | Popeck .................... | G09B 7/02 434/322 |
| 2005/0277101 | A1* | 12/2005 | Cadman ................... | G09B 7/02 434/350 |
| 2006/0029920 | A1* | 2/2006 | Bruno ...................... | G09B 7/06 434/323 |
| 2009/0049089 | A1 | 2/2009 | Adachi et al. | |

(Continued)

FOREIGN PATENT DOCUMENTS

| | | |
|---|---|---|
| JP | 2004-152115 | 5/2004 |
| JP | 2014-178358 | 9/2014 |

(Continued)

*Primary Examiner* — Peter R Egloff

(74) *Attorney, Agent, or Firm* — Fujitsu Patent Center

(57) ABSTRACT

An information processing apparatus is configured to display, on a display device, in a first display form, a first query including a question and a plurality of choices that are answers to the question, obtain behavior information indicating a behavior of a user when the user answers the first query in the first display form, determine a first confidence level of the user for the first query in the first display form and a reliability of the first confidence level, when the reliability is less than a threshold value, display the first query on the display device in a second display form, and determine a second confidence level of the user for the first query based on a first answer of the user to the first query in the first display form and a second answer of the user to the first query in the second display form.

20 Claims, 18 Drawing Sheets

(56) References Cited

U.S. PATENT DOCUMENTS

| | | | | |
|---|---|---|---|---|
| 2011/0151425 A1* | 6/2011 | Smith | .................. | G09B 7/00 |
| | | | | 434/350 |
| 2012/0208166 A1* | 8/2012 | Ernst | .................. | G09B 7/08 |
| | | | | 434/353 |
| 2012/0214147 A1* | 8/2012 | Ernst | .................. | G09B 7/00 |
| | | | | 434/353 |
| 2015/0235564 A1* | 8/2015 | Lynch | .................. | G09B 7/04 |
| | | | | 434/362 |
| 2015/0243179 A1* | 8/2015 | Zaslavsky | ........... | G06F 3/04842 |
| | | | | 434/327 |
| 2015/0294579 A1* | 10/2015 | Rudolph | ............ | G09B 19/00 |
| | | | | 434/353 |
| 2018/0114455 A1* | 4/2018 | Brecknell | ............ | G06F 21/552 |

FOREIGN PATENT DOCUMENTS

| | | |
|---|---|---|
| WO | 2007/066451 | 6/2007 |
| WO | 2010/045356 | 4/2010 |

\* cited by examiner

NUMBER OF QUESTIONS Q:Q=floor (S)

3=floor (3.5)

OR WAITING TIME T:T=floor (S)

NUMBER OF QUESTIONS Q:Q=floor (K/C)

2=floor (52/20)

FIG. 13

QUESTION BEFORE CHANGE

QUESTION n — 13
SELECT WORLD'S HIGHEST MOUNTAIN
P1 — MT. KENYA    MT. BLANC — P2
P3 — MT. EVEREST  MT. FUJI — P4

INSERTED UNRELATED QUESTIONS {
QUESTION n+1 — 13
SELECT WORLD'S LONGEST RIVER
P1 — NILE RIVER    YANGTZE RIVER — P2
P3 — AMAZON RIVER  MISSISSIPPI RIVER — P4

QUESTION n+2
}

QUESTION DISPLAY MODE OF WHICH HAS BEEN CHANGED

QUESTION n+3 — 13
SELECT THE HIGHEST MOUNTAIN IN THE WORLD
P1 — MT. BLANC   MT. KENYA — P2
P3 — MT. FUJI    MT. EVEREST — P4

INFORMATION PROCESSING APPARATUS, METHOD AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2017-108752, filed on May 31, 2017, the entire contents of which are incorporated herein by reference.

FIELD

The embodiments discussed herein are related to a method, an information processing apparatus, a method and a non-transitory computer-readable storage medium.

BACKGROUND

In related arts, a learning device has been proposed that displays a query including a question and two or more choices for the question, accepts a choice selected by a user, and determines a knowledge level of the user in accordance with whether or not the answer is correct.

A case in which an answer of the user is correct includes a case in which the answer is correct in accordance with the knowledge level of the user and a case in which the knowledge level of the user is insufficient but a randomly-selected choice is correct by accident.

Therefore, the learning device obtains a confidence level when the user answers the questions and determines whether the user has answered the questions with confidence based on the confidence level. In addition, the learning device estimates a degree of understanding of the user in accordance with the confidence level of the user for the answer. For example, it has been proposed that a confidence level when the user answers a question is estimated by measuring a gaze direction (line of sight) or brain-waves of the user. Japanese Laid-open Patent Publication No. 2004-152115, International Publication Pamphlet No. WO2007/066451, Japanese Laid-open Patent Publication No. 2014-178358, and International Publication Pamphlet No. WO2010/045356 are related arts.

SUMMARY

According to an aspect of the invention, an information processing apparatus includes a display device; and a processor coupled to the display device, the processor configured to display, on the display device, in a first display form, a first query including a question and a plurality of choices that are answers to the question, obtain behavior information indicating a behavior of a user when the user answers the first query in the first display form, determine, based on the behavior information, a first confidence level of the user for the first query in the first display form and a reliability of the first confidence level, when the reliability is less than a threshold value, display the first query on the display device in a second display form different from the first display form, and determine a second confidence level of the user for the first query based on a first answer of the user to the first query in the first display form and a second answer of the user to the first query in the second display form.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 13 is a second diagram illustrating display of a question the display mode of which has been changed.

DESCRIPTION OF EMBODIMENTS

In the related arts, in a case in which the user has selected a choice immediately after the question including the question and the two or more choices for the question has been displayed, it has been difficult to obtain a confidence level when the user answers the question.

Figure 1:
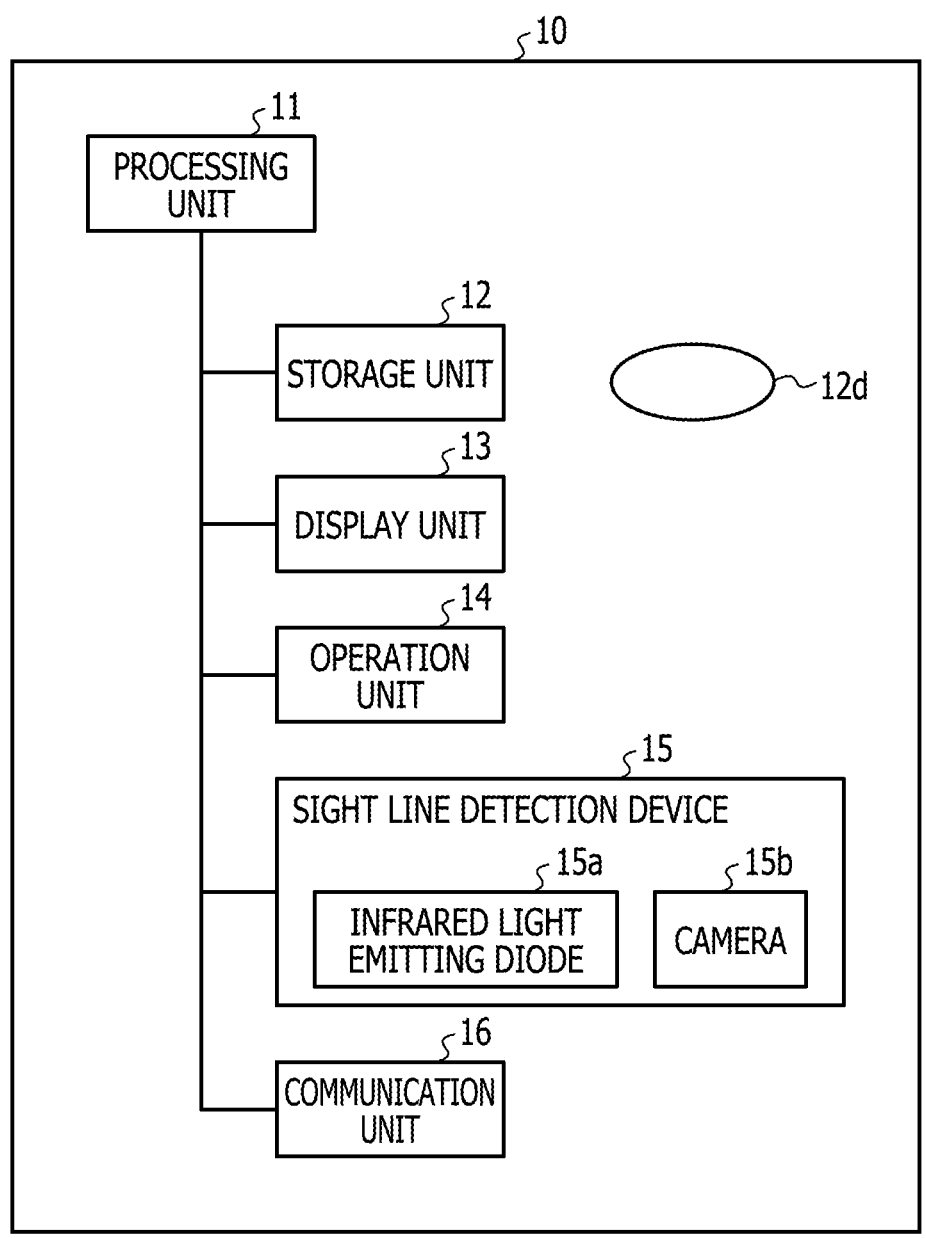
FIG. 1 is a diagram illustrating an embodiment of an information processing apparatus of the technology discussed herein.
Figure 2A:
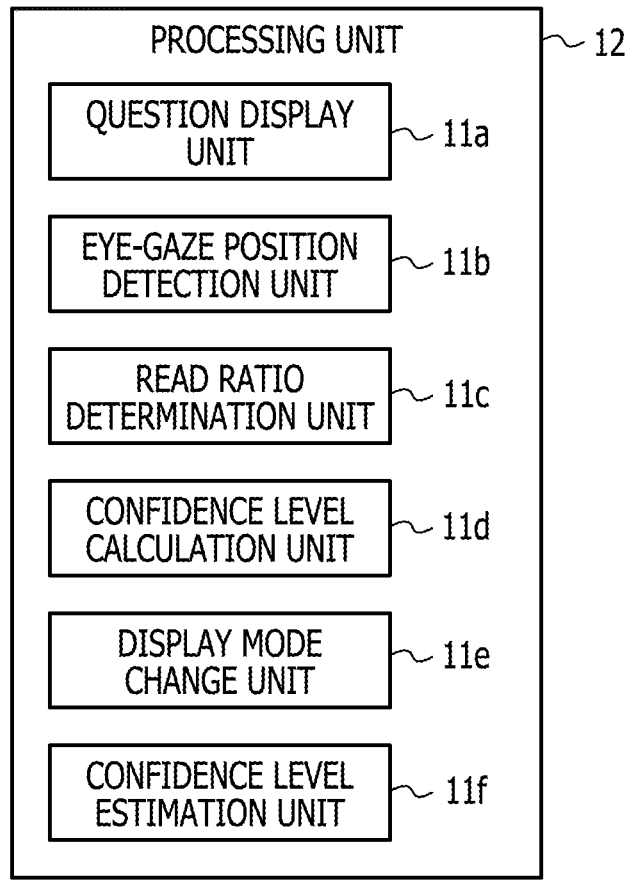
FIG. 2A is a diagram illustrating a processing unit.
Figure 2B:
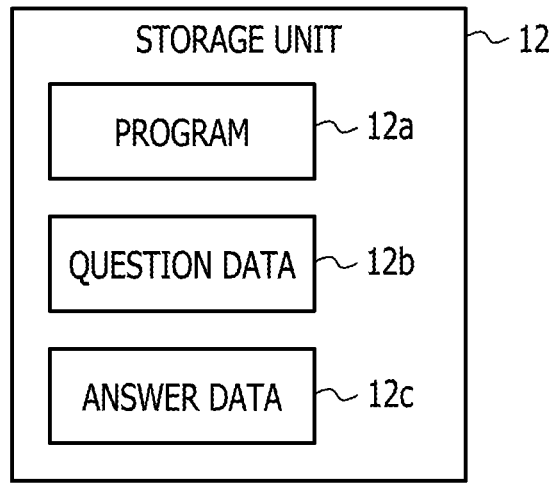
FIG. 2B is a diagram illustrating a storage unit.

FIG. 1 is a diagram illustrating an embodiment of an information processing apparatus of the technology discussed herein. FIG. 2A is a diagram illustrating a processing unit, and FIG. 2B is a diagram illustrating a storage unit.

An information processing apparatus (hereinafter also simply referred to as a device) 10 of the technology discussed herein is a learning device that supports learning of the user. The device 10 displays a query including a question and two or more choices for the question, accepts an input of a choice that has been selected by the user, and determines whether or not the answer is correct.

In addition, the device 10 obtains a confidence level of the user for the answer and reliability of the confidence level when the user answers the question. The device 10 estimates a knowledge level and/or a degree of understanding of the user for the question in accordance with whether or not the answer is correct and the confidence level of the user.

As a combination of the correctness of the answer and the confidence level of the user, there are four cases as follows. The cases are (a) case in which the answer is correct and the confidence level is high, (b) case in which the answer is correct and the confidence level is low, (c) case in which the answer is incorrect and the confidence level is high, and (d) case in which the answer is incorrect and the confidence level is low.

When the answer of the user is incorrect, typically, it is presumed that the knowledge level and/or the degree of understanding of the user is insufficient (cases of (c) and (d)).

When the answer of the user is correct, and the confidence level is high, it is presumed that the knowledge level and/or the degree of understanding of the user is sufficient (case of (a)).

When the answer of the user is correct, and the confidence level is low, it is presumed that the knowledge level and/or the degree of understanding of the user is insufficient, but the randomly-selected choice is correct by accident (case of (b)).

The device 10 determines whether the answer of the user is correct.

In addition, the device 10 obtains a confidence level of the user for the answer and reliability of the confidence level when the user has answered the question in accordance with an eye-gaze position of the user when the user has answered the question and a display position of the question on the screen of a display unit. The query includes a question and two or more choices.

When the user selects a choice immediately after the question including the question and the two or more choices for the question has been displayed, the reliability of the confidence level when the user answers the question becomes low, and therefore, it may be difficult to obtain the confidence level.

The device 10 presents, to the user, a question the display mode of which has been changed and which has the same content as the content before the change when the reliability of the confidence level is low. In addition, the device 10 estimates a confidence level in accordance with the answer of the user before the change and the answer of the user after the change.

A detail of the device 10 is described below.

The device 10 includes a processing unit 11, a storage unit 12, a display unit 13, an operation unit 14, a line of sight detection device 15, and a communication unit 16.

The processing unit 11 includes one or more processors and peripheral circuits. The processing unit 11 executes control of hardware configuration elements of the device 10 and various pieces of processing in accordance with a certain program 12a stored in the storage unit 12 in advance and uses the storage unit 12 for temporary storage of data generated during the pieces of processing.

The storage unit 12 may include a semiconductor memory such as a random access memory (RAM) or a read-only memory (ROM) or a non-volatile memory such as a magnetic disk or a flash memory. In addition, the storage unit 12 may include a drive (not illustrated) that reads a program stored in a non-transitory storage medium 12d.

As illustrated in FIG. 2B, the storage unit 12 stores the certain program 12a, question data 12b including information on a question and an answer to the question displayed on the display unit 13, and answer data 12c including information on an answer that has been selected by the user. The question data 12b also includes a position at which a question and two or more choices of the question, which are related to the question, are respectively displayed on the screen of the display unit 13. The answer data 12c also includes information in which the answer that has been selected by the user is associated with the question.

In addition, the storage unit 12 stores various pieces of data used to detect an eye-gaze position of the user. For example, the storage unit 12 stores a reference table indicating a relationship between a relative position of the gravity point of a pupil to the gravity point of a Purkinje image and a line of sight direction of the user and a reference table indicating a relationship between the line of sight direction and an eye-gaze position. In addition, the storage unit 12 stores an image of the eye of the user, which has been obtained from the line of sight detection device 15, coordinates of measurement points at eye-gaze positions before calibration, which have been detected in accordance with the images, and obtaining order of the measurement points, or the like.

The display unit 13 may display various pieces of information related to operation of the device 10 on the screen by control of the processing unit 11. The question including the question and the two or more choices for the question is displayed at a certain position on the screen, which is stored in the storage unit 12 so as to be associated with the question. As the display unit 13, for example, a liquid crystal display may be used.

Through the operation unit 14, an operation by the user of the device 10 may be input. For example, the device 10 may use a keyboard or a mouse as the operation unit 14. In addition, a touch panel obtained by integrating the operation unit 14 and the display unit 13 with each other may be used as the operation unit 14. The user selects one of the two or more choices by operating the operation unit 14 and input the selected choice to the device 10.

The line of sight detection device 15 is arranged around the display unit 13 and generates measurement data indicating the line of sight direction of the user at certain intervals (for example, 1 millisecond to 33 milliseconds). In addition, the line of sight detection device 15 outputs the generated measurement data to the processing unit 11.

For example, the line of sight detection device 15 includes an infrared light emitting diode (LED) 15a and a camera 15b including an imaging optical system and an infrared sensitive image sensor such as a charge coupled device (CCD) or a complementary metal-oxide semiconductor (C-MOS). In addition, the line of sight detection device 15 generates, through the camera 15b, an image in which a pupil of the eye of the user and a corneal refection image in which light that has been emitted from the infrared LED 15a is reflected by a cornea (hereinafter referred to as a Purkinje image) appear as measurement data.

In the embodiment, the line of sight detection device 15 is arranged above or below the display unit 13 or on the side of the display unit 13 so as to face the user who looks at the display unit 13. The infrared LED 15a included in the line of sight detection device 15 illuminates the eyes of the user. In addition, the camera 15b included in the line of sight detection device 15 generates an image in which the whole face of the user or a part of the face appears, which includes at least one of the eyes of the user who watches the display unit 13.

The communication unit 16 performs transmission and reception of pieces of information, for example, through a network which is not illustrated. The communication unit 16 may include a communication circuit and a communication line by which transmission and reception of pieces of information are performed. For example, the device 10 may perform transmission and reception of question data or answer data by using the communication unit 16.

As illustrated in FIG. 2A, the above-described processing unit 11 includes a question display unit 11a, an eye-gaze position detection unit 11b, a read ratio determination unit 11c, a confidence level calculation unit 11d, a display mode change unit 11e, and a confidence level estimation unit 11f.

These units included in the processing unit 11 are, for example, function modules realized by a computer program operated on the processor included in the processing unit 11. These units included in the processing unit 11 are may be installed in the device 10 as respective different circuits. These units are described below.

The question display unit 11a reads the question data 12b stored in the storage unit 12, generates one or more questions, and displays the questions at respective certain positions on the screen of the display unit 13. In addition, the question display unit 11a displays a question the display mode of which has been changed at a certain position on the screen of the display unit 13.

Each time the processing unit 11 obtains an image from the line of sight detection device 15, the eye-gaze position detection unit 11b detects an area in which the eye of the user appears on the image and detects a Purkinje image and a pupil in the area in which the eye appears. In addition, the eye-gaze position detection unit 11b detects the eye-gaze position of the user in accordance with a positional relationship between the gravity points of the Purkinje image and the corresponding pupil.

First, the eye-gaze position detection unit 11b detects an area in which the eye appears. The pixel brightness corresponding to the eye is greatly different from the pixel brightness around the eye. Therefore, the eye-gaze position detection unit 11b detects edge pixels in which the brightness is changed in the vertical direction, for example, by calculating a difference between adjacent pixels in the vertical direction by using a Sobel filter for the pixels in the image. In addition, for example, the eye-gaze position detection unit 11b set, as an eye area, an area in which the certain number or more of edge pixels are coupled to each other, which corresponds to the size of the eye in the approximately horizontal direction, and are enclosed by two edge lines. Alternatively, the eye-gaze position detection unit 11b may detect an area that best matches a template indicating a statue of the eye on the image by template matching of the image and the template and sets the detected area as the eye area.

In addition, the eye-gaze position detection unit 11b detects an area in which the pupil appears in the eye area. In the embodiment, the eye-gaze position detection unit 11b performs template matching between a template corresponding to the pupil and the eye area, and detects an area in which a coincidence degree with the template becomes the highest in the eye area. In addition, the eye-gaze position detection unit 11b determines that the pupil appears in the detected area when the maximum value of the coincidence degree is higher than a certain threshold value for the coincidence degree.

In addition, the brightness of the area in which the pupil appears is lower than the brightness of the surrounding area, and the pupil is roughly circular. Therefore, the eye-gaze position detection unit 11b sets two concentric rings of different radiuses in the eye area. In addition, when a difference value obtained by subtracting an average value of the pixel brightness of the inner ring from an average value of the pixel brightness of the outer ring is larger than a certain threshold value, the eye-gaze position detection unit 11b may set an area enclosed by the inner ring as a pupil area. The eye-gaze position detection unit 11b calculates an average value of horizontal direction coordinate values of pixels included in the pupil area and an average value of vertical direction coordinate values of the pixels as coordinates of the gravity point of the pupil area.

In addition, the eye-gaze position detection unit 11b detects a Purkinje image of the infrared LED 15a included in the line of sight detection device 15 in the eye area. The eye-gaze position detection unit 11b calculates an average value of horizontal direction coordinate values of pixels included in the Purkinje image and an average value of horizontal direction coordinate values of the pixels as coordinates of the gravity point of the Purkinje image.

When the gravity points of the pupil and the Purkinje image are detected, the eye-gaze position detection unit 11b detects the line of sight direction of the user in accordance with the gravity points.

The surface of the cornea has a substantially spherical shape, such that the position of the Purkinje image of the light source included in the line of sight detection device 15 is substantially the same regardless of a line of sight direction. In addition, the gravity point of the pupil moves in accordance with a line of sight direction of the user. Therefore, the eye-gaze position detection unit 11b may detect the line of sight direction of the user by obtaining the relative position of the gravity point of the pupil to the gravity point of the Purkinje image as a reference.

In the embodiment, the eye-gaze position detection unit 11b obtain the relative position of the gravity point of the pupil to the gravity point of the Purkinje image as the reference, for example, by respectively subtracting the horizontal direction coordinate and the vertical direction coordinate of the gravity point of the Purkinje image from the horizontal direction coordinate and the vertical direction coordinate of the gravity point of the pupil. In addition, the eye-gaze position detection unit 11b determines a line of sight direction of the user with reference to the reference table indicating a relationship between a relative position of the gravity point of the pupil and the line of sight direction of the user.

When the eye-gaze position detection unit 11b detects the line of sight direction of the user, the eye-gaze position detection unit 11b detects the eye-gaze position of the user on the screen of the display unit 13 in accordance with the line of sight direction of the user and an assumed positional relationship between the eye of the user and the display unit 13.

In the embodiment, the eye-gaze position detection unit 11b obtains a measurement point of the eye-gaze position of the user, with reference to the reference table indicating the relationship between the line of sight direction and the eye-gaze position of the user in the assumed positional relationship between the eye of the user and the screen of the display unit 13. In addition, the eye-gaze position detection unit 11*b* stores coordinates of measurement points of the eye-gaze positions of the user on the screen of the display unit 13 in the storage unit 12 with the obtaining order of the measurement points. The obtaining order of the measurement points of the eye-gaze positions may be represented by numbers corresponding to the order or acquisition time points of an image of the eye of the user, at each of which the corresponding measurement point has been obtained.

The read ratio determination unit 11*c* compares the number of detected return sweeps and the number of detected eye-gaze lines to the question or the two or more choices displayed on the screen of the display unit 13, and determines a read ratio indicating a ratio in which the user reads the question or the two or more choices. In a representative movement pattern of a line of sight determined when the user reads a document, the eye-gaze position on the screen is greatly moved backward at the time of switching of the reading rows. The return sweep is a trajectory of the great movement of the eye-gaze position backward, which corresponds such switching of the reading rows. In addition, the eye-gaze line indicates a trajectory of movement of the eye-gaze position, which corresponds to reading of one row, which includes a series of fixation and slight forward movement between two adjacent return sweeps in a detected time or at the detected position on the screen.

For example, the read ratio determination unit 11*c* calculates, as a read ratio, a proportion of the number of eye-gaze lines for the number of rows of a display document. Alternatively, the read ratio determination unit 11*c* may calculate, as a read ratio, a proportion of a larger one of the number of eye-gaze lines and the number of return sweeps for the number of rows of the display document.

The confidence level calculation unit 11*d* obtains a confidence level of the user for the answer and reliability of the confidence level when the user has answered the question, in accordance with a time change in the eye-gaze position of the user when the user answered the question and display areas of the question or the two or more choices on the screen of the display unit 13.

For example, the confidence level calculation unit 11*d* obtains a confidence level as a score of 0.0 to 1.0. The confidence level indicates that the confidence is low as the score becomes lower and indicates that the confidence is high as the score becomes higher.

In addition, the confidence level calculation unit 11*d* obtains reliability of the obtained confidence level as a score of 0.0 to 1.0. The reliability of the confidence level indicates that the reliability of the confidence level is lower as the score becomes lower, and indicates that the reliability of the confidence level is higher as the score becomes higher.

When the reliability of the confidence level is high, it is indicated that accuracy of the score of the confidence level of the user is statistically high. In addition, when the reliability of the confidence level is low, it is indicated that accuracy of the score of the confidence level of the user is statistically low.

The confidence level calculation unit 11*d* compares the reliability of the confidence level to a certain threshold value and determines a degree of the confidence level. The certain threshold value is determined depending on accuracy desired for the confidence level as appropriate. As the certain threshold value, for example, 0.7, 0.5, or 0.3 may be set.

Specifically, the confidence level calculation unit 11*d* uses a statistical learning algorithm that has learned, in advance, to obtain a confidence level of the user for the answer and reliability of the confidence level, in accordance with the eye-gaze position of the user and the display positions of the question or the two or more choices on the screens of the display unit 13. As the statistical algorithm, for example, a regression analysis method using a K-nearest neighbor algorithm, a binary tree algorithm, or the like is used. The confidence level calculation unit 11*d* may use another known method as the method to obtain a confidence level of the user for the answer and reliability of the confidence level.

The display mode change unit 11*e* determines whether the reliability of the confidence level of the user for the answer when the user has answered the question is high or low, in accordance with the reliability of the confidence level, which has been obtained by the confidence level calculation unit 11*d*. For example, when the reliability of the confidence level is lower than the certain threshold value, the display mode change unit 11*e* determines that the reliability of the confidence level is low. Specifically, the display mode change unit 11*e* determines that the reliability of the confidence level is low when the reliability of the confidence level is less than 0.7, 0.5, or 0.3.

In the case in which the reliability of the confidence level is low, whether the confidence level of the user for the answer when the user has answered the question is statistically accurate is unclear (ambiguous). Therefore, in the device 10, when the reliability of the confidence level is low, a new question that has been obtained by changing the display mode of the original question has been changed is generated, the new question is displayed on the display unit 13, and an input of the answer of the user is accepted. It is desirable that knowledge level and/or a degree of user understanding desired for the user of the new question that has been obtained by changing the display mode of the original question be equivalent to that of the question before the change. Operation is described later in which the display mode change unit 11*e* generates the new question that has been obtained by changing the display mode of the original question.

The confidence level estimation unit 11*f* estimates a confidence level of the user for the question before the display mode is changed, in accordance with the answer of the user to the question before the display mode is changed (hereinafter also referred to as a first question) and the answer of the user to the question after the display mode has been changed (hereinafter also referred to as a second question). For example, when the answer of the user for the first question is correct, and the answer of the user for the second question is also correct, it is presumed that the knowledge level and/or the degree of understanding of the user for the first question is sufficient, and the confidence level of the user is high. In addition, when the answer of the user for the first question is correct, and the answer of the user for the second question is incorrect, it is presumed that the knowledge level and/or the degree of understanding of the user for the first question is insufficient, and the confidence level of the user is low.

Figure 3:
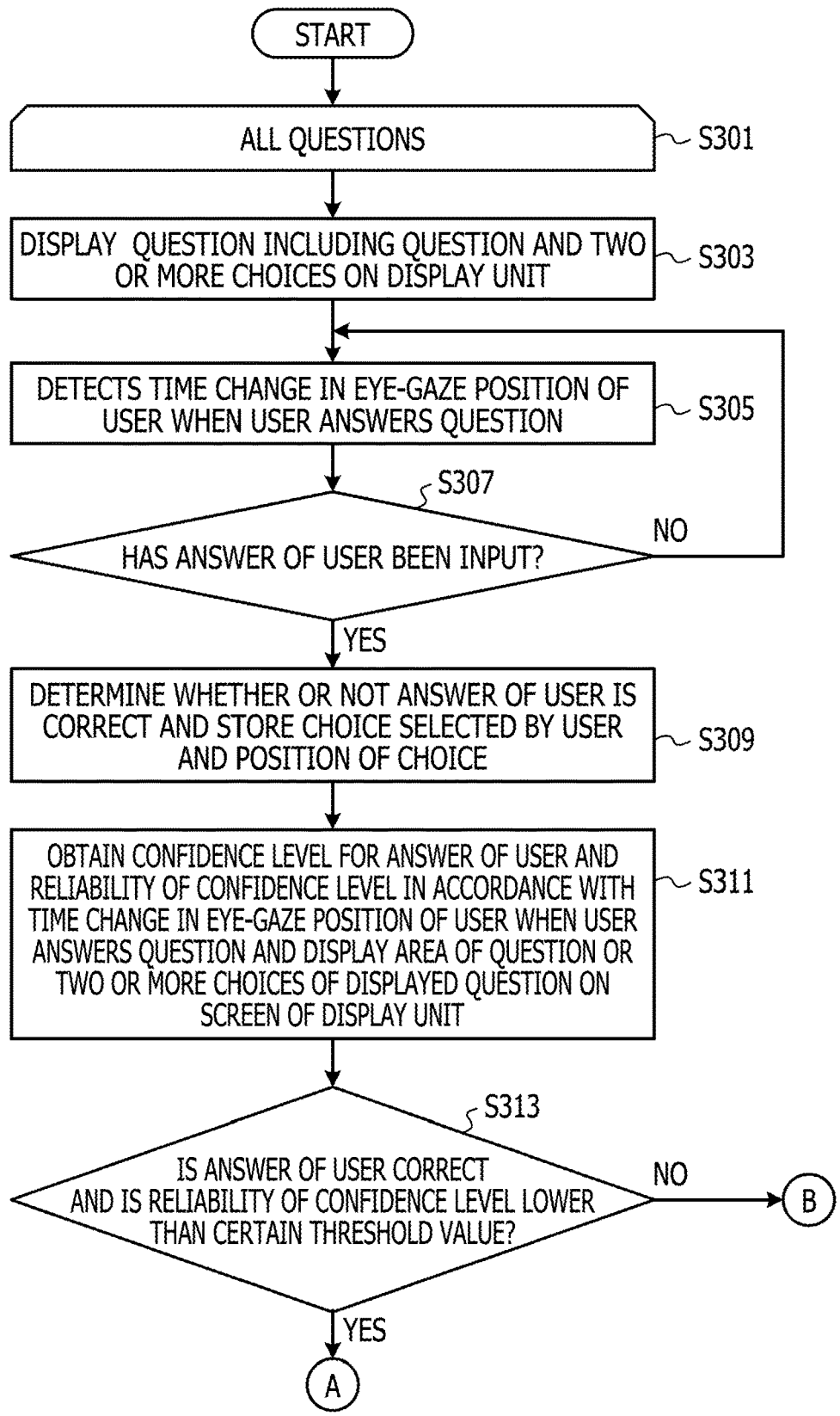
FIG. 3 is a first flowchart illustrating operation of the information processing apparatus of the technology discussed herein.
Figure 4:
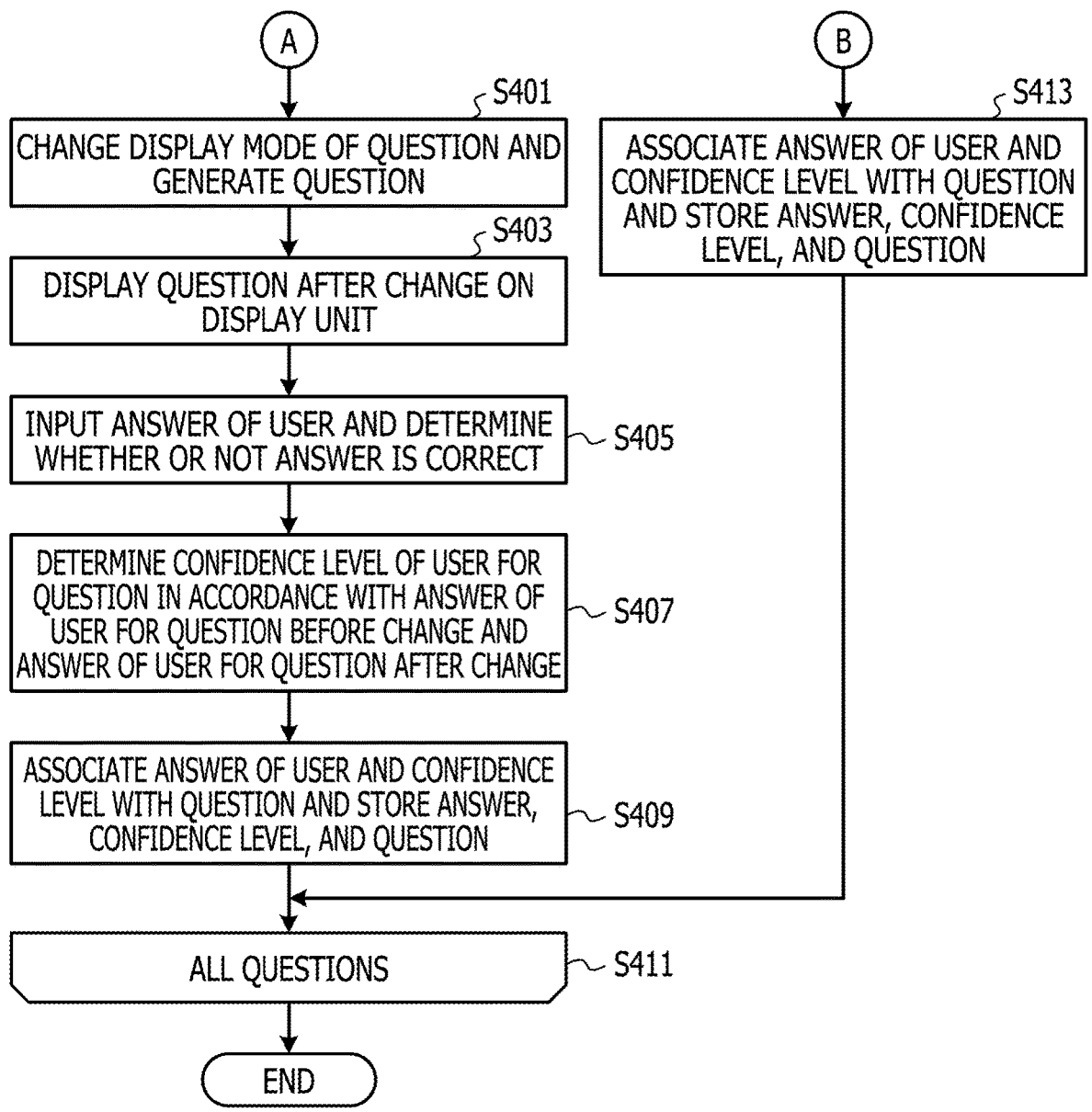
FIG. 4 is a second flowchart illustrating operation of the information processing apparatus of the technology discussed herein.

The above operation of the device 10 is described below with reference to the flowcharts illustrated in FIG. 3 and FIG. 4.

For all questions to be presented to the user, processing of Steps S301 to S411 is executed.

Figure 6A:
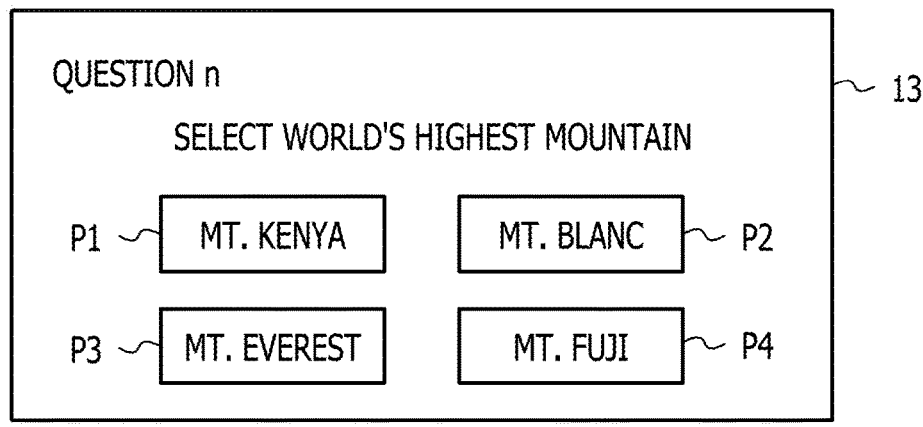
FIGS. 6A, 6B, 6C, and 6D are first diagrams illustrating generation of a question the display mode of which has been changed.

First, in Step S303, the question display unit 11*a* of the processing unit 11 reads the question data 12*b* stored in the storage unit 12 and displays a question on the screen of the display unit 13. For example, as illustrated in FIG. 6A, a question and four choices included in the question are displayed on the screen of the display unit 13. In FIG. 6A, the question n (n is an integer which is zero or more) displayed on the display unit 13 is illustrated. The question n includes a question and four choices. The positions of the question and the four choices of the question n on the screen of the display unit 13 are determined in accordance with information included in the question data 12*b* stored in the storage unit 12. In the example illustrated in FIG. 6A, choices are respectively displayed in areas P1 to P4 on the screens of the display unit 13.

Next, in Step S305, the eye-gaze position detection unit 11*b* of the processing unit 11 detects a time change in an eye-gaze position indicating a behavior of the user when the user answers the question displayed on the screen of the display unit 13 (behavior information of the user). The eye-gaze position detection unit 11*b* may associate the detected time change in the eye-gaze position of the user with the question and store the time change and the question in the storage unit 12.

Next, in Step S307, the confidence level calculation unit 11*d* of the processing unit 11 determines whether the user has input the answer through the operation unit 14. When the user does not input the answer (Step S305-No), the user is in the middle of answering the question, such that the processing returns to Step S305. The eye-gaze position detection unit 11*b* continues to detect a time change in the eye-gaze position of the user.

In addition, when the user selects one of the two or more choices through the operation unit 14 and inputs an answer of the choice (Step S305-Yes), the confidence level calculation unit 11*d* determines whether or not the answer of the user is correct. In addition, the confidence level calculation unit 11*d* stores the choice that has been selected by the user and the position of the choice in the storage unit 12 with the determination result (Step S309).

Next, in Step S311, the confidence level calculation unit 11*d* obtains a confidence level of the user for the answer and reliability of the confidence level when the user has answered the question. The confidence level calculation unit 11*d* outputs the confidence level and the reliability of the confidence level by using the time change in the eye-gaze position of the user when the user answers the question and the display areas of the two or more choices on the screen of the display unit 13 as pieces of input information. In the embodiment, the confidence level calculation unit 11*d* obtains the confidence level as the score of 0.0 to 1.0. In addition, the confidence level calculation unit 11*d* obtains the reliability of the confidence level as a score of 0.0 to 1.0.

Next, in Step S313, the display mode change unit 11*e* changes the display mode of the first question to generate a second question when the reliability of the confidence level is lower than a certain threshold value, and the answer of the user is correct. In the embodiment, when the reliability of the confidence level is lower than 0.5 (Step S313-Yes), the confidence level calculation unit 11*d* determines that the reliability of the confidence level is low and generates the second question (Step S401). As described above, when the reliability of the confidence level is low, it is indicated that accuracy of the score of the confidence level of the user is statistically low. In the embodiment, in order to accurately compute the confidence level of the user when the answer of the user is correct, a second question is not generated when the answer of the user is incorrect. Even when the answer of the user is incorrect, the second question may be generated.

In addition, when the reliability of the confidence level is 0.5 or more (Step S313-No), the confidence level calculation unit 11*d* associates the answer and the confidence level of the user with the question and stores the answer, the confidence level, and the question in the storage unit 12 as pieces of information included in the answer data 12*c* (Step S413).

Figure 5:
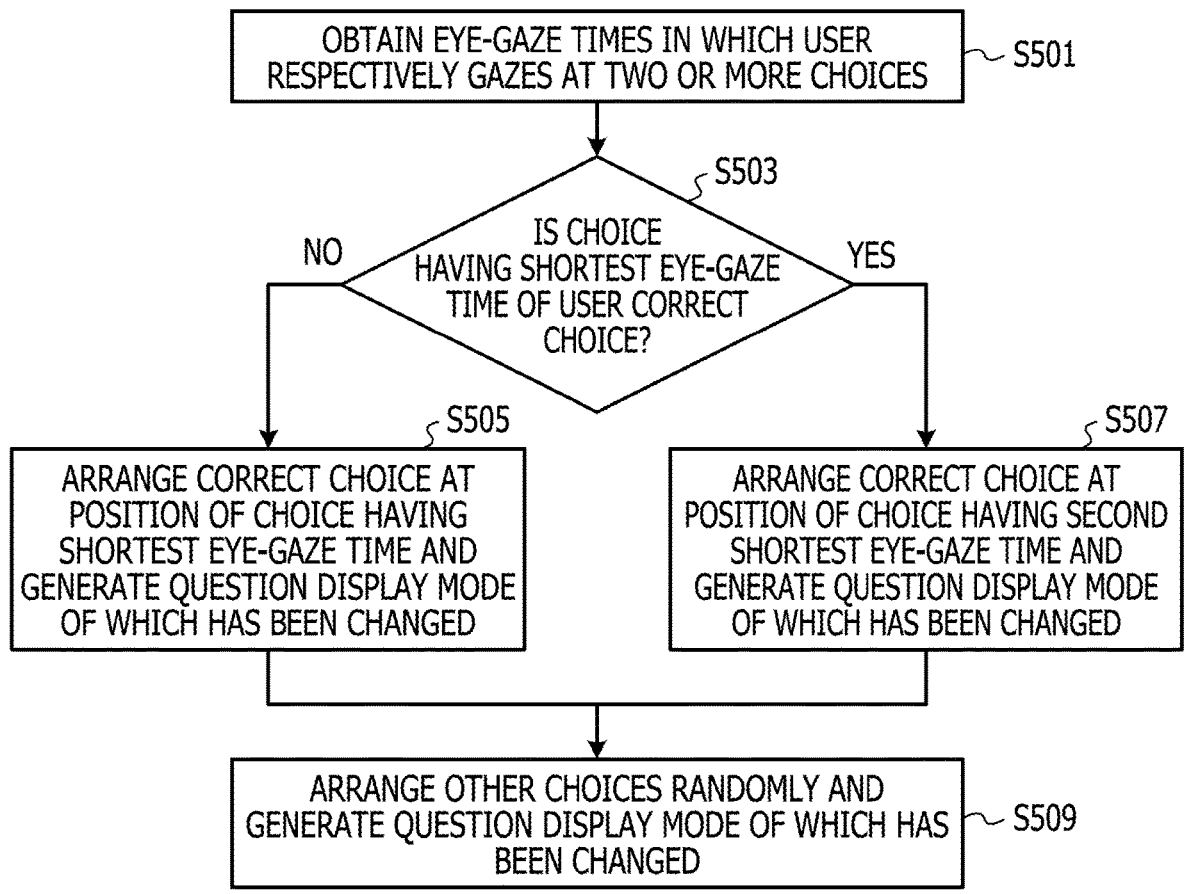
FIG. 5 is a third flowchart illustrating operation of the information processing apparatus of the technology discussed herein.

Next, in Step S401, processing in which the display mode change unit 11*e* changes the display mode of a first question and generates a second question is described below with reference to FIGS. 5 to 7. Here, the content of the second question is generated so as to be substantially the same as the content of the first question, and therefore, the knowledge level and/or the degree of understanding of the user, which is similar to that desired for the first question, is checked for presentation of the second question.

First, in Step S501, the display mode change unit 11*e* obtains eye-gaze times in which the user respectively gazes at the two or more choices in the first question. Specifically, the display mode change unit 11*e* obtains a time in which the eye-gaze position of the user stays in the areas P1 to P4 in which corresponding choices are displayed on the screen of the display unit 13, as eye-gaze times, respectively.

Figure 6B:
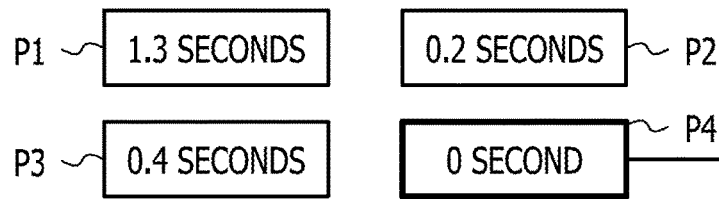

FIG. 6B illustrates eye-gaze times in which the user respectively gazes at choices for a question n (first question) illustrated in FIG. 6A, which is displayed on the screen of the display unit 13.

In the example illustrated in FIG. 6B, an eye-gaze time for a choice "Mt. Kenya" is 1.3 seconds, an eye-gaze time for a choice "Mont Blanc" is 0.2 seconds, an eye-gaze time for a choice "Mt. Everest" is 0.4 seconds, and an eye-gaze time for a choice "Mt. Fuji" is 0 second. In addition, a correct answer to a question "Select the world's highest mountain" is the choice "Mt. Everest". The display mode change unit 11*e* obtains display of the correct choice "Mt. Everest" in the area P3, in accordance with information on the question data 12*b* in the storage unit 12.

Next, in Step S503, the display mode change unit 11*e* determines whether a choice having the shortest eye-gaze time of the user is a correct choice.

When the choice having the shortest eye-gaze time of the user is not the correct choice (Step S503-No), the display mode change unit 11*e* arranges the correct choice at the position of the choice having the shortest eye-gaze time to generate a question (n+1) (second question) that has been obtained by changing the display mode of the question (n) (Step S505).

In the examples illustrated in FIGS. 6A and 6B, the choice having the shortest eye-gaze time of the user is the choice "Mt. Fuji", which is different from the correct choice "Mt. Everest".

Figure 6C:

As illustrated in FIG. 6C, the display mode change unit 11*e* arranges the correct choice "Mt. Everest" in the area P4 in which the choice "Mt. Fuji" having the shortest eye-gaze time has been originally displayed.

Figure 6D:
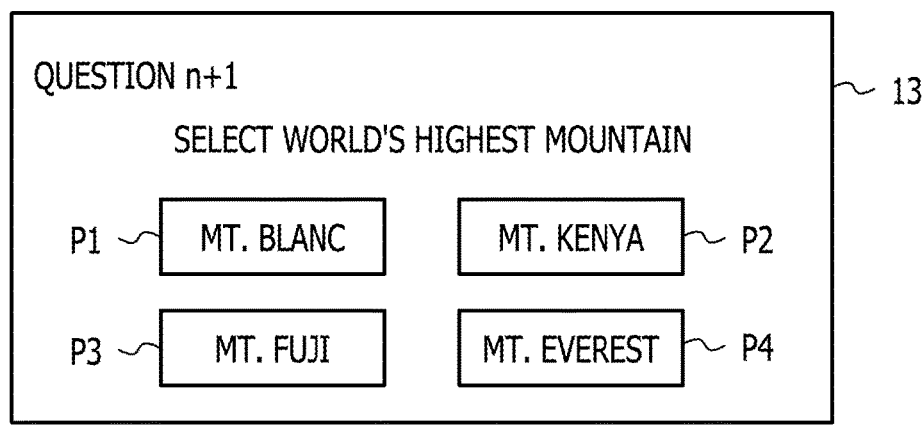

Next, in Step S509, as illustrated in FIG. 6D, the display mode change unit 11*e* respectively arranges the other three choices in the area P1 to P3 randomly to generates the question (n+1) (second question) that has been obtained by changing the display mode of the question n. As described above, the question (n+1) is generated such that the positions of the four choices of the question n are changed.

In addition, when a choice having the shortest eye-gaze time of the user is a correct choice (Step S503-Yes), the display mode change unit 11*e* arranges the correct choice at the position of the choice having the second shortest eye-gaze time to generates the question (n+1) (second question) that has been obtained by changing the display mode of the question n (Step S507).

Figure 7A:
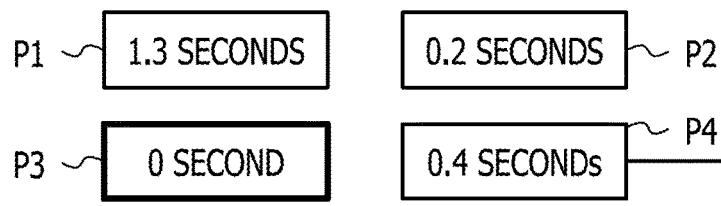
FIGS. 7A, 7B, 7C and 7D are second diagrams illustrating generation of a question the display mode of which has been changed.

FIG. 7A illustrates eye-gaze times in which the user respectively has gazed at the choices for the question n illustrated in FIG. 6A (first question), which has been displayed on the screen of the display unit 13. In the example illustrated in FIG. 7A, the choice having the shortest eye-gaze time of the user is the correct choice "Mt. Everest".

Figure 7B:

As illustrated in FIG. 7B, the display mode change unit 11e arranges the correct choice "Mt. Everest" in the area P2 in which the choice "Mont Blanc" having the second shortest eye-gaze time has been originally displayed.

Figure 7C:
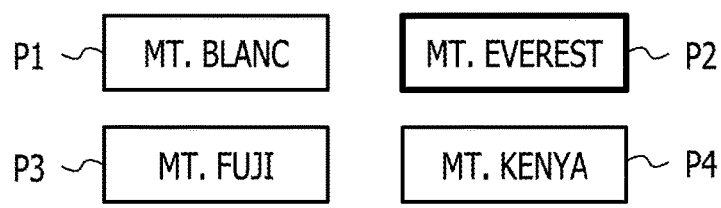
Figure 7D:
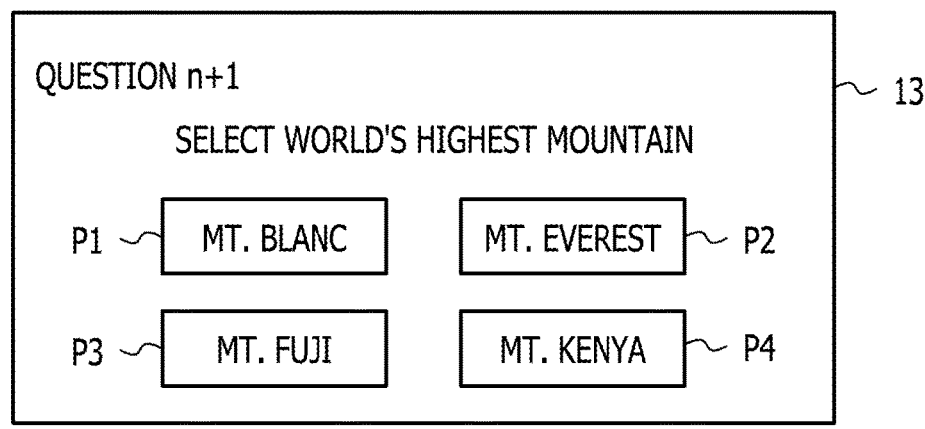

Next, in Step S509, as illustrated in FIG. 7C, the display mode change unit 11e respectively arranges the other three choices in the areas P1, P3, and P4 randomly to generate the question (n+1) (second question) that has been obtained by changing the display mode of the question n. The question (n+1) is generated such that the positions of the four choices of the question n are changed.

When the user answers the question, the user may give up answering the question because the knowledge level and/or the degree of understanding of the user is insufficient. In such a case, the user may automatically select a choice that the user has gazed at the most. Therefore, in the embodiment, the correct choice is arranged at the position of the choice having the shortest eye-gaze time or the second shortest eye-gaze time in the question n (first question) to generate the question (n+1) (second question). As described above, an influence from the user's memory for the choices is reduced when the user answers the question (n+1) (second question).

The processing of Step S401 is described above.

Next, in Step S403, as illustrated in FIG. 6D or 7C, the question display unit 11a of the processing unit 11 displays, on the display unit 13, the question (n+1) (second question) that has been obtained by changing the display mode of the question n.

Next, in Step S405, the confidence level estimation unit 11f of the processing unit 11 accepts an input of the answer by the user and determines whether or not the answer is correct.

Next, in Step S407, the confidence level estimation unit 11f estimates a confidence level of the user for the question n (first question) in accordance with the answer (correct answer) of the user for the question n (first question) and the answer of the user for the question (n+1) (second question). When the answer to the question (n+1) (second question) is correct, the knowledge level and/or the degree of understanding of the user is sufficient, such that the confidence level estimation unit 11f estimates that the confidence level of the user for the answer to the question n (first question) is high. For example, in the case in which the user answers the question n (first question), it is assumed that reliability of the confidence level of the user for the answer is high when the user has selected a choice instantaneously. Here, it is presumed that the user has selected the choice instantaneously because the user has selected the correct answer with high confidence.

In addition, when the question (n+1) (second question) is incorrect, the knowledge level and/or the degree of understanding of the user is insufficient, such that the confidence level estimation unit 11f estimates that the confidence level of the user for the answer to the question n (first question) is low. For example, in a case in which the user answers the question n (first question), it is assumed that reliability of the confidence level of the user for the answer is low when the user has selected a choice instantaneously. Here, it is presumed that the user has selected the choice instantaneously because the user has given up answering the question and has selected a choice randomly.

In the embodiment, a confidence level of the user for an answer and reliability of the confidence level when the user has answered the question (n+1) (second question) are not obtained, but the confidence level and the reliability of the confidence level for the question (n+1) may be obtained and referred to for the estimation of the confidence level in Step S407.

Next, in Step S411, the confidence level estimation unit 11f associates the answer of the user and the confidence level with the question, and stores the answer, the confidence level, and the question in the storage unit 12 as the answer data 12c.

Next, when not all questions are presented to the user, the processing returns to Step S301.

In the above-described embodiment, when the reliability of the confidence level for the question is low, a new question that has been obtained by changing the display mode of the original question is generated once and presented to the user, but the question the display mode of which has been changed may be generated two or more times and presented to the user. In this case, whether or not the answer of the user is correct may be determined by using a majority rulebased on the number of correct answers.

Next, another embodiment in which a second question is generated by changing the display mode of a first question is described below with reference to FIGS. 8 to 18.

Figure 8:
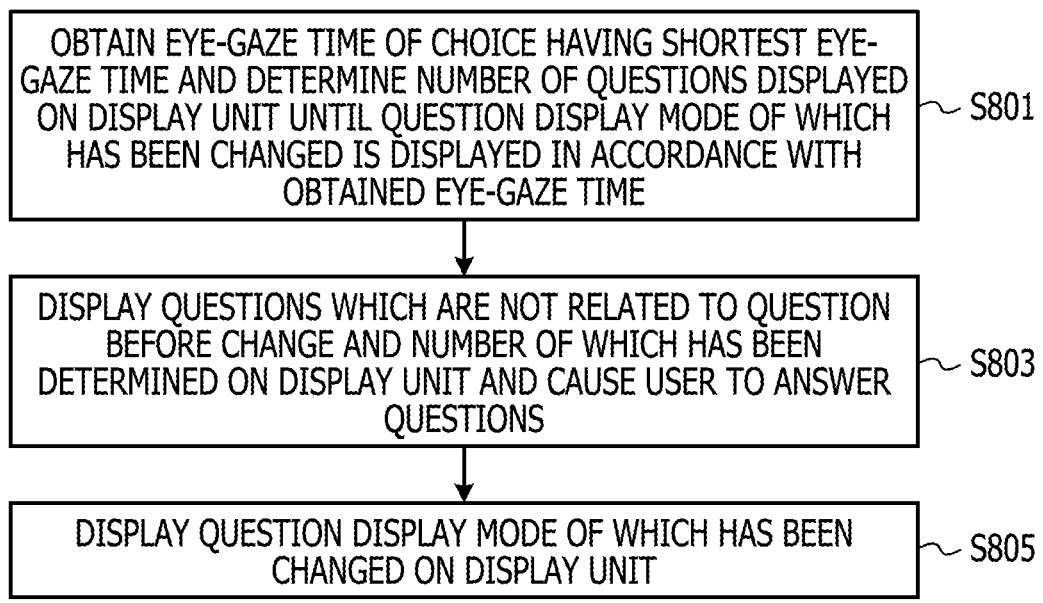
FIG. 8 is a fourth flowchart illustrating operation of the information processing apparatus of the technology discussed herein.
Figure 9:
FIG. 9 is a third diagram illustrating generation of a question the display mode of which has been changed.
Figure 10:
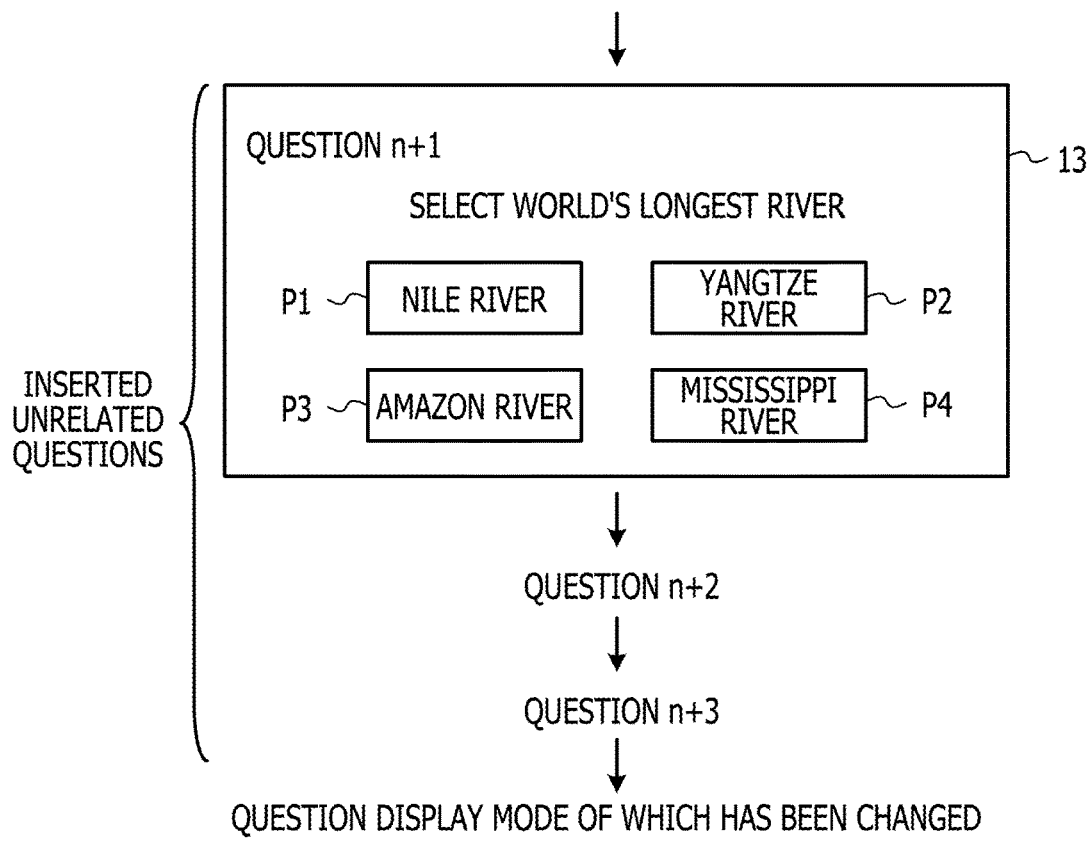
FIG. 10 is a first diagram illustrating display of a question the display mode of which has been changed.

FIGS. 8 to 10 illustrate processing in a second embodiment.

In the second embodiment, processing corresponding to the processing of Steps S401 and S403 in the above-described first embodiment is different. Therefore, the processing in the second embodiment, which corresponds to the processing of Steps S401 and S403, is described below. The other processing in the second embodiment is similar to that of the above-described first embodiment.

First, in Step S801 (corresponding to Step S401), a display mode change unit 11e of a processing unit 11 obtains an eye-gaze time S of a choice having the shortest eye-gaze time from among four choices to be displayed on a display unit 13. In addition, the display mode change unit 11e determines, in accordance with the eye-gaze time S, the number of questions Q displayed on the display unit 13 until a question (n+1) (second question) is displayed on the display unit 13 after the user has answered a question n (first question) (see FIG. 9).

As illustrated in FIG. 9, the eye-gaze times of the user when the user answers the question n are 4.1 seconds for a choice of an area P1, 4.7 seconds for a choice of an area P2, 3.5 seconds for a choice of an area P3, and 4.2 seconds for a choice of an area P4. The choice having the shortest eye-gaze time is the choice of the area P3, respectively.

The display mode change unit 11e obtains a value P (3) that is an integer portion of the eye-gaze time S (3.5 seconds) for the choice of the area P3. The display mode change unit 11e determines the number of questions displayed on the display unit 13 to be the value P until the second question is displayed on the display unit 13 after the user has answered the question n (first question). P other questions that are not related to the question n (first question) are inserted between the question n (first question) and the second question.

Next, in Step S803, as illustrated in FIG. 10, the question display unit 11a of the processing unit 11 displays three questions (n+1), (n+2), and (n+3) that are not related to the question n (first question) on the display unit 13 and presents the three questions to the user after the question display unit 11a has displayed the question n on the display unit 13. The user respectively inputs answers to the questions (n+1), (n+2), and (n+3) through the operation unit 14. A time taken until the user answers the questions (n+1), (n+2), and (n+3)

after the questions have been displayed on the display unit 13 is a waiting time until the second question is displayed on the display unit 13 after the user has answered the question n (first question). When the user answers the other questions during the waiting time, a memory of the user, in which the user has answered the question n (first question), is expected to diminish.

Next, in Step S805 (corresponding to Step S403), the question display unit 11a displays a second question that has been obtained by changing the display mode of the question n, on the display unit 13 as a question n+4 after the user has input an answer of the question (n+3). The question n+4 (second question) may be generated similar to that of the above-described first embodiment.

When the user answers a question, the user tends to memorize a content of a choice as a time in which the user gazes at the choice becomes longer. Therefore, in the embodiment, a reduction in an influence from the memorized content is achieved by increasing a waiting time until the second question is presented to the user after the user has answered the question n (first question), depending on an eye-gaze time of a choice.

In the above-described embodiment, the number of questions inserted between the question n (first question) and the question (n+1) (second question) is determined in accordance with the value P that is the integer portion (3) of the eye-gaze time S (3.5 seconds) for the choice of the area P3. Similarly, as illustrated in FIG. 9, a waiting time T until the second question is displayed on the display unit after the user has answered the question n (first question) may be determined in accordance with the value P (3) that is the integer portion of the eye-gaze time S (3.5 seconds) for the choice of the area P3. During the waiting time, other questions that are not related to the question n (first question) may be presented to the user.

The above description is made for the second embodiment.

Figure 11:
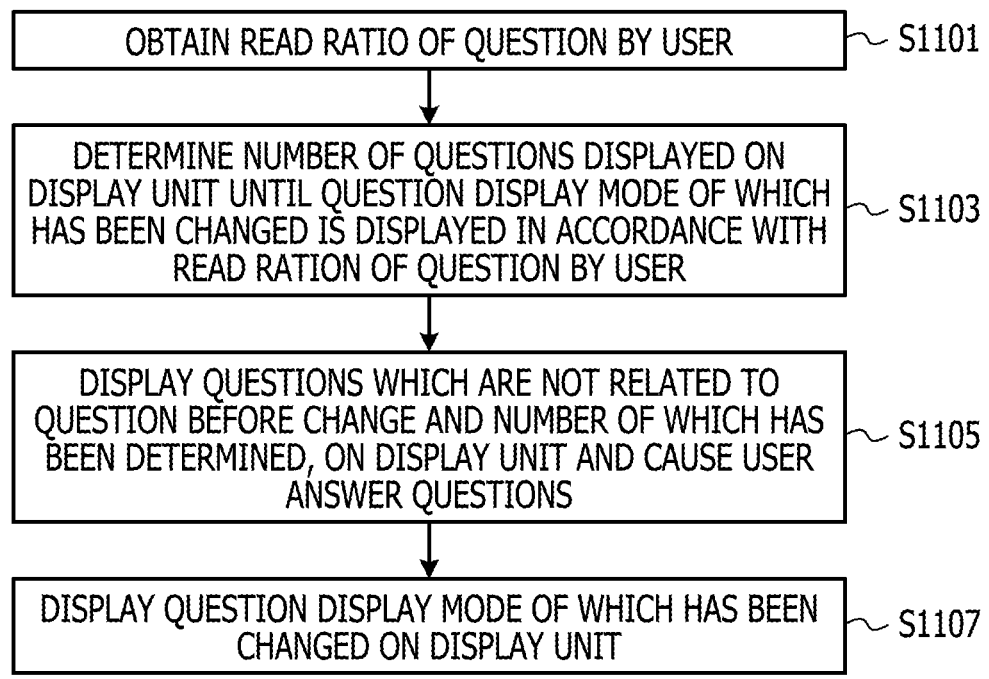
FIG. 11 is a fifth flowchart illustrating operation of the information processing apparatus of the technology discussed herein.
Figure 12:
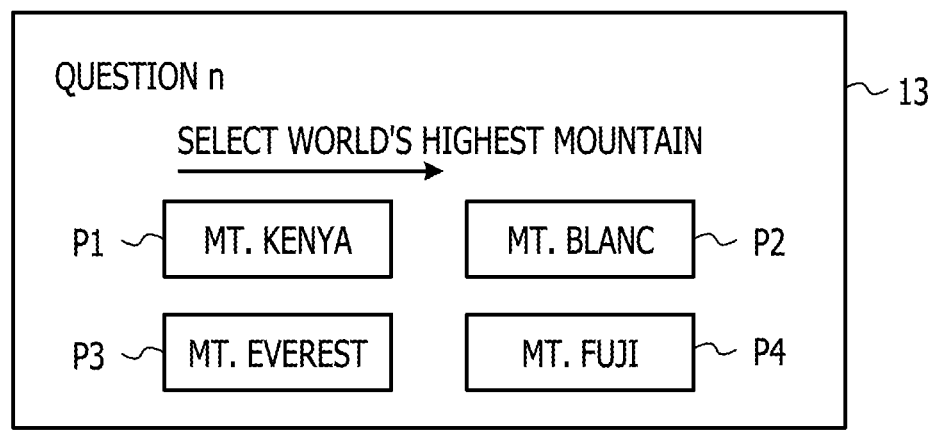
FIG. 12 is a fourth diagram illustrating generation of a question the display mode of which has been changed.

FIGS. 11 to 13 illustrate processing in a third embodiment.

Here, in the third embodiment, processing corresponding to the processing of Steps S305, S401, and S403 in the above-described first embodiment is different. Therefore, the processing in the third embodiment, which corresponds to the processing of Steps S305, S401, and S403, is described below. The other processing in the third embodiment is similar to the corresponding processing of the above-described first embodiment.

First, in Step S1101 (corresponding to Step S305), as illustrated in FIG. 12, a read ratio determination unit 11c of a processing unit 11 obtains a read ratio in which the user has read a question of a question n in accordance with a time change of the eye-gaze position of the user when the user answers the question n (first question) and the display area of the question of the question n on the screen of the display unit 13. In the embodiment, a ratio of the portion of the question, which has been read by the user, to the length of a displayed sentence of the question is calculated by using a percentage as the read ratio. In addition, the eye-gaze position detection unit 11b of the processing unit 11 detects the eye-gaze position of the user similar to the first embodiment.

In the example illustrated in FIG. 12, a read ratio K is 52%.

Next, in Step S1103 (corresponding to Step S401), a display mode change unit 11e of the processing unit 11 obtains a value P (2) that is an integer portion of a quotient (K/C) that has been obtained by dividing the read ratio K (53%) by a certain constant C (20). In addition, the display mode change unit 11e determines, to be the value P (2), the number of questions to be displayed until the question (n+1) (second question) is displayed on the display unit 13 after the user has answered the question n (first question).

Next, in Step S1105, as illustrated in FIG. 13, a question display unit 11a of the processing unit 11 displays two questions (n+1) and (n+2) that are not related to the question n (first question) on the display unit 13 after the question n has been displayed on the display unit 13. The user inputs answers for the respective questions (n+1) and (n+2) through the operation unit 14. A time until the user respectively answers the questions (n+1) and (n+2) after the questions have been displayed on the display unit 13 is a waiting time until the second question is displayed on the display unit 13 after the user has answered the question n (first question). When the user answers the other questions during the waiting time, a memory of the user, in which the user has answered the question n (first question), is expected to diminish.

Next, in Step S1107 (corresponding to Step S403), the question display unit 11a displays the second question that has been obtained by changing the display mode of the question n, on the display unit 13 as a question (n+3) after the user has input the answer for the question (n+2). The question (n+3) (second question) may be generated similar to that of the above-described first embodiment.

When the user answers a question, the user tends to memorize a content of a question as a time in which the user gazes at the question becomes longer. Therefore, in the embodiment, a reduction in an influence from the memorized content is achieved by increasing a waiting time until the second question is presented to the user after the user has answered the question n (first question), depending on a read ratio having a correlation with the eye-gaze time of the question.

In the above-described embodiment, the number of questions inserted between the question n (first question) and the question (n+1) (second question) is determined in accordance with a value P that is an integer portion of a quotient (K/C) that has been obtained by dividing the read ratio K by a certain constant C. Similarly, a waiting time until the second question is displayed on the display unit after the user has answered the question n (first question) may be determined in accordance with the value P that is the integer portion of the quotient (K/C) that has been obtained by dividing the read ratio K by the certain constant C. During the waiting time, other questions that are not related to the question n (first question) may be presented to the user.

The above description is made for the third embodiment.

Figure 14:
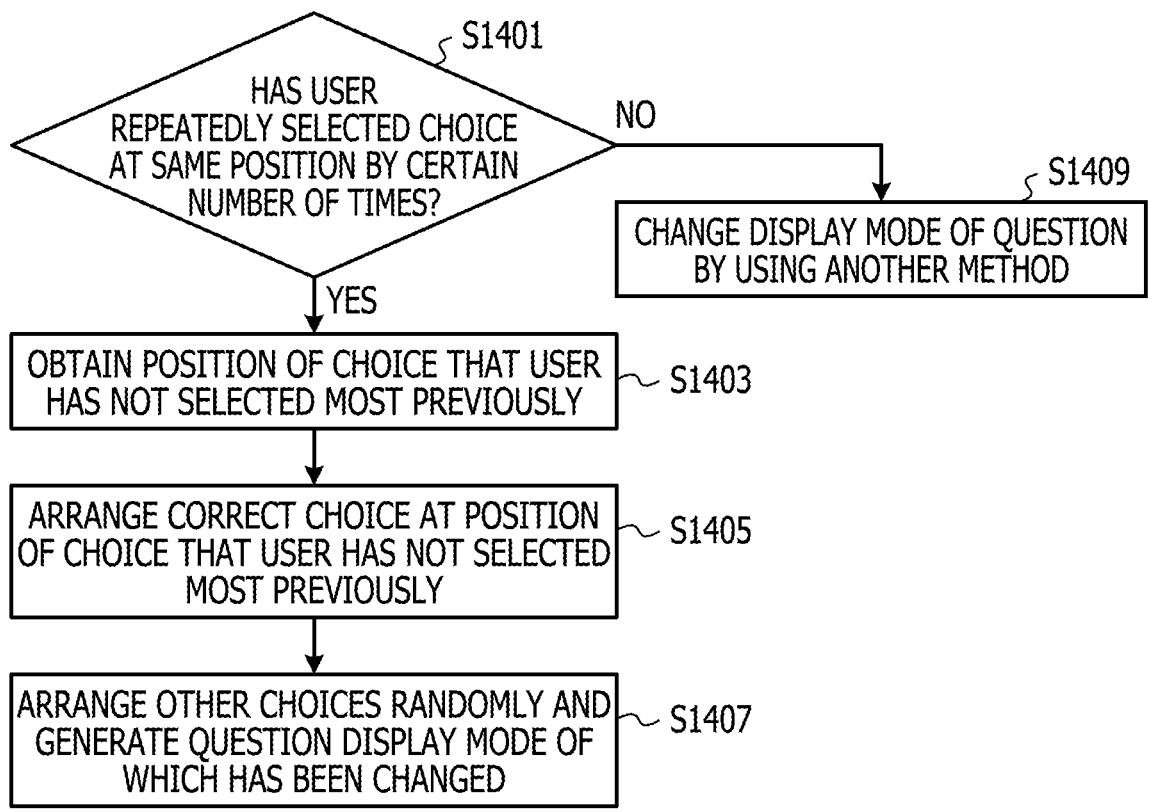
FIG. 14 is a sixth flowchart illustrating operation of the information processing apparatus of the technology discussed herein.
Figure 15:
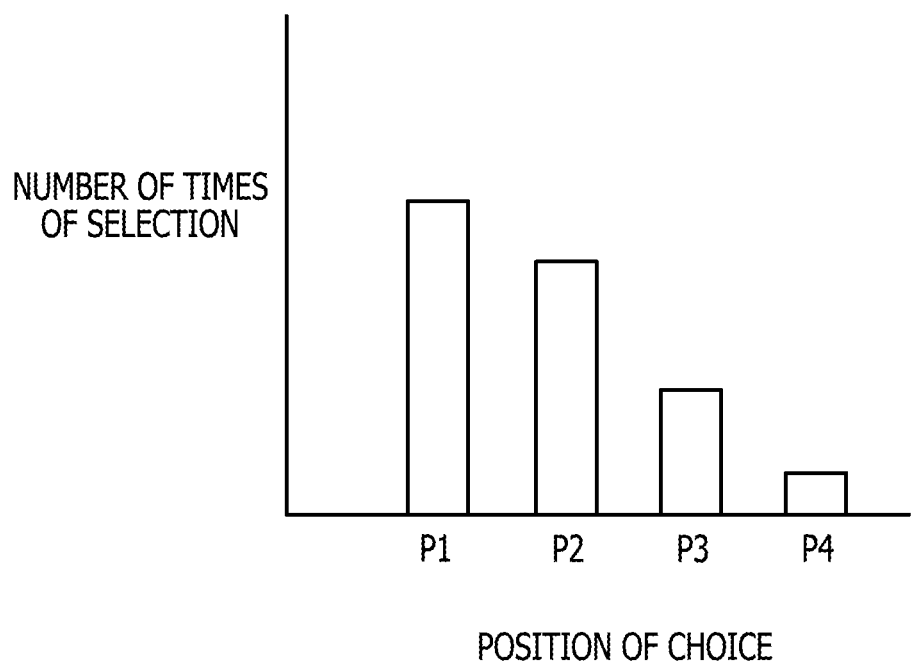
FIG. 15 is a fifth diagram illustrating generation of a question the display mode of which has been changed.
Figure 16:
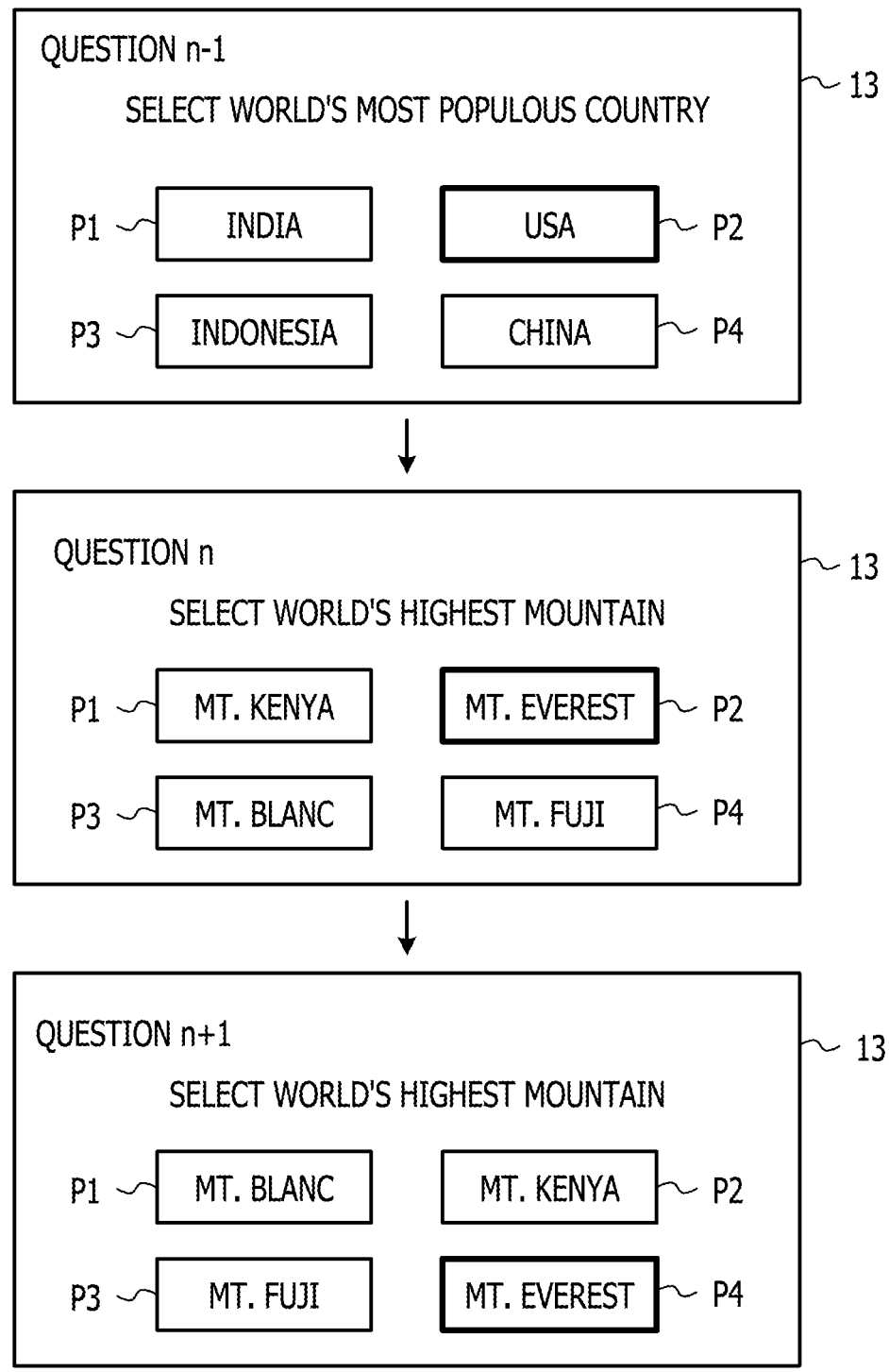
FIG. 16 is a sixth diagram illustrating generation of a question the display mode of which has been changed.

FIGS. 14 to 16 illustrate processing in a fourth embodiment.

In the fourth embodiment, processing corresponding to the processing of Steps S309, S401, and S403 in the above-described first embodiment is different. Therefore, the processing in the fourth embodiment, which corresponds to the processing of Step S309, S401, and Step S403, is described below. The other processing in the fourth embodiment is similar to that of the above-described first embodiment.

First, in Step S1401 (corresponding to Step S309), an eye-gaze position detection unit 11b of a processing unit 11 accepts an input of a choice that has been selected by the user. In addition, the eye-gaze position detection unit 11b determines, for sequentially-presented questions, whether the user has repeatedly selected a choice displayed at the same position on the screen of the display unit 13 from among two or more choices by the certain number of times.

The certain number of times may be determined depending on desired accuracy of a confidence level as appropriate. As the certain number of times, for example, the selection may be performed twice or three times.

As illustrated in FIG. 15, each time the user answers a question, the eye-gaze position detection unit 11*b* obtains the total number of times of selection of the four areas P1 to P4 by the user, in accordance with the positions of the choices that have been selected by the user. In the example illustrated in FIG. 15, the number of times of selection of each of the four areas P1 to P4 by the user is decreased in order of the areas P1 to P4.

In addition, a confidence level calculation unit 11*d* of the processing unit 11 determines whether or not the answer is correct of the user and stores the choice that has been selected by the user and the position of the choice in the storage unit 12 with the determination result (Step S1401 (corresponding to Step S309)).

As illustrated in FIG. 16, it is assumed that the user has selected a choice in the area P2 on the screen of the display unit 13 for a question n−1, and the user also has selected a choice in the same area P2 on the screen of the display unit 13 for the question n. In this case, an eye-gaze position detection unit 11*b* determines that the user has repeatedly selected a choice displayed at the same position on the screen of the display unit 13 twice (Step S1401-Yes). Here, it is assumed that the certain number of times in Step S1401 is twice.

In the example illustrated in FIG. 16, in each of the questions, four choices are respectively displayed in the same four areas P1 to P4 on the screen of the display unit 13. For each of the questions n−1 and n, four choices are respectively displayed at the same positions on the screen of the display unit 13. In this case, "same positions on the screen of the display unit" respectively indicate the same areas as on the screen of the display unit 13.

In addition, in the technology discussed herein, "same positions on the screen of the display unit" include a case in which the positions of selected choices are relatively the same in a positional relationship with the other choices. In the example illustrated in FIG. 16, the four choices in the question n−1 are arranged at the four corners of a rectangle. Here, similar to the question n−1, as long as the four choices in the question n are arranged at the corresponding four corners of the rectangle, the dimension or the aspect ratio of the rectangle or the positions of the choices on the screen of the display unit may be different from that of the question n−1. In the questions n−1 and n, when a choice arranged at the upper right corner of the rectangle is selected, it is indicated that a choice displayed at "same position on the screen of the display unit" has been repeatedly selected.

When the user has repeatedly selected a choice displayed at the same position on the screen of the display unit 13 (Step S1401-Yes), the display mode change unit 11*e* of the processing unit 11 obtains the position of a choice, which the user has not selected the most in the past (Step S1403 (corresponding to Step S401)).

As illustrated in FIG. 15, the display mode change unit 11*e* obtains the area P4 as the position of a choice, which the user has not selected the most in the past, in accordance with statistical information on positions of choices that the user has selected in the past.

Next, in Step S1405 (corresponding to Step S401), as illustrated in FIG. 16, the display mode change unit 11*e* arranges a correct choice "Mt. Everest" in the area P4 that is the position of a choice, which the user has not selected the most in the past as an answer to generates the question (n+1) (second question).

Next, in Step S1407 (corresponding to Step S401), as illustrated in FIG. 16, the display mode change unit 11*e* arranges the other choices in the remaining areas P1 to P3 randomly to generate the question (n+1) the display mode of which has been changed (second question). In addition, the question display unit 11*a* displays the question (n+1) (second question) on the display unit 13 (corresponding to Step S403).

When the user answers the question, the user may give up processing the answer because the knowledge level and/or the degree of understanding of the user is insufficient. In such a case, the user may repeatedly select a choice at the same position on the screen of the display unit 13. Therefore, in the embodiment, the device 10 arranges a correct choice at the position of a choice, which the user has not selected as an answer the most in the past to generate a question (n+1) (second question).

The above description is made for the fourth embodiment.

Figure 17:
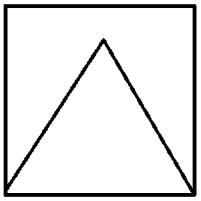
FIG. 17 is a seventh flowchart illustrating generation of a question the display mode of which has been changed.

FIG. 17 illustrates processing in a fifth embodiment.

In the fifth embodiment, processing corresponding to the processing of Step S401 in the above-described first embodiment is different. Therefore, the processing in the fifth embodiment, which corresponds to the processing of Step S401, is described below. The other processing in the fifth embodiment is similar to that of the above-described first embodiment.

In the embodiment, the display mode change unit 11*e* switches the display mode of a question in a question n (first question) and the display mode of two or more choices in the question n (first question) to generate a question (n+1) (second question).

In the question n (first question) of the example illustrated in FIG. 17, the question is represented by a picture of a mountain, and the four choices are represented by characters as the names of mountains.

In the question (n+1) (second question), the question is represented by characters to select a mountain, and the four choices are respectively represented by pictures of mountains.

Pictures corresponding to the names of the mountains of the four choices in the question n (first question) are respectively included in the four pictures of the mountains in the question (n+1) (second question), and the contents of the second question are substantially the same as those of the first question.

As described above, in the embodiment, the picture corresponding to the display mode of the question in the question n (first question) and the characters corresponding to the display mode of the two or more choices in the question n (first question) are switched to generate the question (n+1) (second question).

As long as the knowledge level and/or the degree of understanding of the user is sufficient, it is expected that a correct choice is selected by the user even for the second question that has been generated by switching the display mode of the question and the display mode of the two or more choices in the first question.

In the embodiment, from such a viewpoint, the question (n+1) (second question) is generated, and a confidence level of the user for the answer is estimated.

The above description is made for the fifth embodiment.

Figure 18:
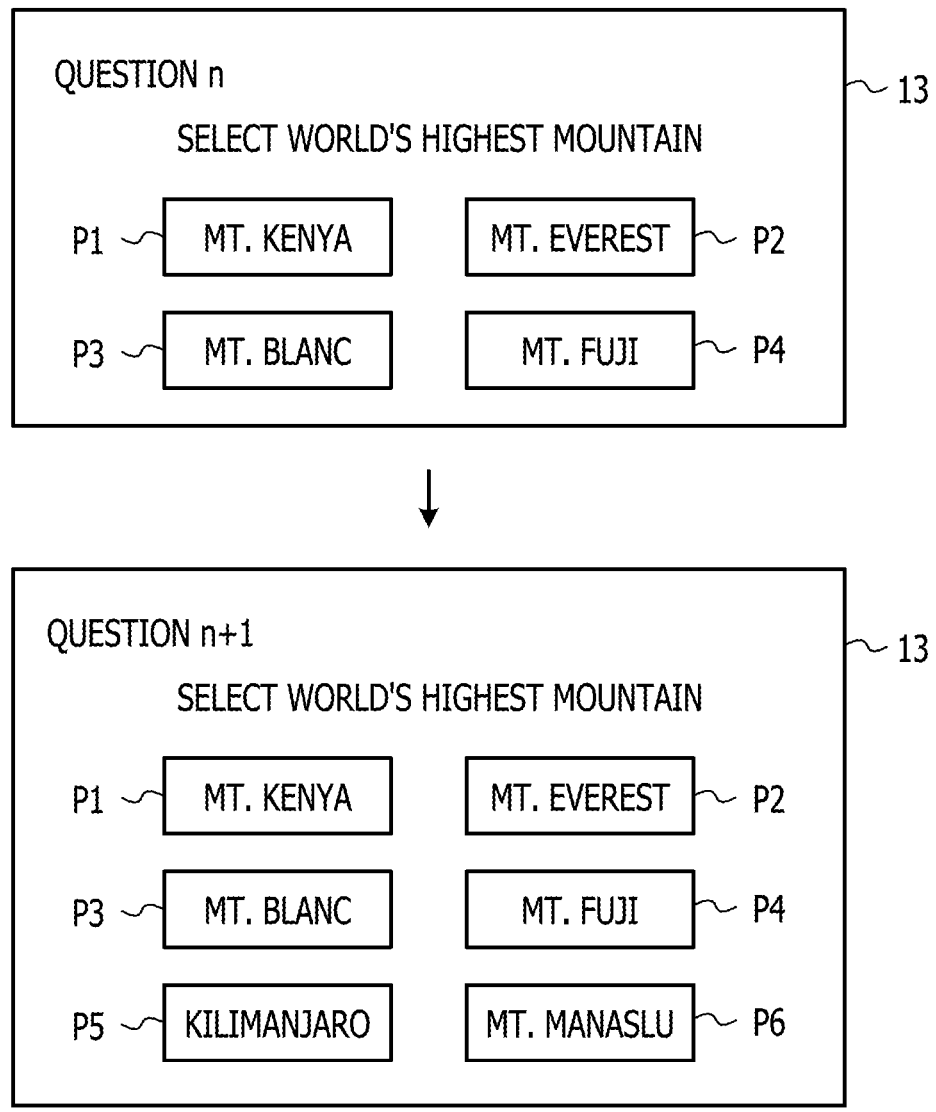
FIG. 18 is an eighth flowchart illustrating generation of a question the display mode of which has been changed.

FIG. 18 illustrates processing in a sixth embodiment.

In the sixth embodiment, processing corresponding to the processing of Step S401 in the above-described first embodiment is different. Therefore, the processing in the sixth embodiment, which corresponds to the processing of Step S401, is described later. The other processing in the sixth embodiment is similar to that of the above-described first embodiment.

In the embodiment, a display mode change unit 11e adds a new choice to two or more choices in a question n (first question) to generate a question (n+1) (second question).

In the question n (first question) of the example illustrated in FIG. 18, four choices are respectively displayed in areas P1 to P4 on a screen of a display unit 13. In the question (n+1) (second question), two choices are added to the four choices, and six choices are respectively displayed in areas P1 to P6 on the screen of the display unit 13. The arrangement of the choices displayed in the areas P1 to P4 may be changed such that arrangement of question (n+1) is different from that of the question n to generate the question (n+1). For example, by using the same method as the first embodiment, the choices respectively displayed on the areas P1 to P4 may be changed such that arrangement of the question (n+1) is different from the question n.

As long as the knowledge level and/or the degree of understanding of the user is sufficient, it is expected that a correct choice is selected even when the number of choices in the first question increases.

In the embodiment, from such a viewpoint, the question (n+1) (second question) that has been obtained by adding a choice to the question n is generated to estimate a confidence level of the user for the answer.

In the device 10 according to the above-described embodiments, even when the confidence level of the user for the answer to the question n (first question) is low, the confidence level when the user answers the question may be estimated by presenting the second question the display mode of which has been changed.

In the technology discussed herein, the information processing program, the information processing apparatus, and the information processing method of the above-described embodiment may be modified as appropriate without departing from the gist of the technology discussed herein.

For example, a confidence level of the user for an answer and reliability of the confidence level may be obtained in accordance with user information other than the eye-gaze position of the user. As the user information other than the eye-gaze position of the user, there are the position of a pointer on the screen of the display unit 13 and biological information on the user.

The position of the pointer of the user on the screen of the display unit 13 when the user answers the first question is obtained, for example, in accordance with the position of a mouse or the touched position on a touch panel. Similar to the eye-gaze position, the position of the pointer on the screen indicates a mind state when the user is processing an answer, and therefore, the position is used as the user information for obtaining the confidence level and the reliability of the confidence level.

In addition, as the biological information on the user when the user answers the first question, for example, a heart rate, a pupil diameter, a head position, and brain-waves may be used. The heart rate is obtained by using a heart rate meter. The pupil diameter is obtained in accordance with an image including the eye of the user, which has been captured by a camera or the like included in a line of sight detection device. The head position is obtained in accordance with an image including the head of the user, which has been captured by a camera. Similar to the eye-gaze position, the biological information indicates the mind state when the user is processing an answer, and therefore, the biological information is used as user information for obtaining a confidence level and reliability of the confidence level.

Reliability of a confidence level of the user for an answer may be obtained by using a statistical learning algorithm classifier that has learned for the answer of the user in advance in accordance with these pieces of user information and the display positions of the question or the two or more choices on the screen of the display unit 13.

The classifier may be generated for each of the pieces of user information or may be generated by using two or more pieces of user information including an eye-gaze position.

In addition, in the above-described embodiments, in Step S313, when the answer of the user is incorrect, and the reliability of the confidence level is lower than the certain threshold value, generation and presentation of the second question are not performed. However, in Step S313, even when the answer of the user is incorrect, and the reliability of the confidence level is lower than the certain threshold value, generation and presentation of the second question may be performed. In the case in which the answer to the first question is incorrect, and the confidence level is low, when the answer to the second question is correct, (1) the user may have selected the choice by mistake as the answer to the first question. Alternatively, (2) the knowledge level and/or the degree of understanding of the user is insufficient, but the answer to the second question may have been correct by accident. In this case, when the answer to the second question is correct, a third question is generated and displayed that has been obtained by further changing the display mode of the second question such that the display mode of the third question is different even from the first question, and an input of an answer of the user may be accepted. When the number of correct answers of the user is more than the number of incorrect answers of the user from among the three answers, it is presumed that the knowledge level and/or the degree of understanding of the user is sufficient, and the confidence level of the user for the answer is high. When the number of correct answers of the user is less than the number of incorrect answers of the user from among the three answers, it is presumed that the knowledge level and/or the degree of understanding of the user is insufficient, and the confidence level of the user for the answer is low. In addition, when the answer to the second question is incorrect, it is presumed that the knowledge level and/or the degree of understanding of the user is insufficient, and the confidence level of the user for the answer is low.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An information processing apparatus comprising:
a display device;
a line-of-sight (LOS) detection device mounted close to a periphery of the display device, the LOS detection device being configured to include an infrared light emitting diode (IR-LED) device and an infrared (IR) image sensor device to generate an image to be used for detecting a LOS of a user;

a memory configured to store plural pieces of question data, each of the plural pieces of question data including query data indicating a query sentence and answer data indicating an answer relating to the query sentence; and a processor circuit coupled to the display device, the LOS detection device, and the memory, the processor circuit being configured to:

obtain first query data from any one of the plural pieces of question data to display the query sentence indicated by the obtained first query data on the display device in a first display form, the query sentence indicated by the first query data including a question and a plurality of choices, each of the plurality of choices being a selection item to be used for answering to the question;

during the displaying of the query sentence indicated by the first query data, obtain a measurement result indicating the LOS of the user by measuring a relative position of a first gravity point to a second gravity point, the first gravity point being a gravity point of a pupil detected from the image generated by the IR image sensor device of the LOS detection device, the second gravity point being a gravity point of a Purkinje image detected from the image generated by the IR image sensor device of the LOS detection device;

convert the obtained measurement result to behavior information indicating a change in an eye-gaze position on a screen of the display device by using a reference information indicating a plurality of data pairs each including a respective direction of the LOS and a corresponding eye-gaze position;

in response to receiving an input of a first answer indicating a selection of a first choice being any one of the plurality of choices of the first query data displayed by the first display form, obtain a first confidence level for the received input by inputting a display area of the query sentence indicated by the first query data and the change in the eye-gaze position indicated by the behavior information into a pretrained model, the pretrained model being a machine learning model having been trained by using the display area of the query sentence and the eye-gaze position obtained in advance to output a higher score as a confidence level for an input of an answer is higher;

in response to the first confidence level being less than a threshold value, convert the query sentence indicated by the first query data to a second display form different from the first display form to display the converted query sentence on the display device, the second display form being configured to replace a display position of the first choice indicated by the first answer with a display position of any one of the plurality choices other than the first choice; and in response to receiving an input of a second answer indicating a selection of any one of the plurality of choices included in the converted query sentence, obtain a second confidence level by adjusting the first confidence level in accordance with whether the second answer for the first query data is identical to the answer indicated by the answer data corresponding to the first query data, wherein the adjusting of the first confidence level is configured to increase the first confidence level in response to the second answer being identical to the answer indicated by the answer data corresponding to the first query data to output the adjusted first confidence level as the second confidence level, and reduce the first confidence level in response to the second answer being not identical to the answer indicated by the answer data corresponding to the first query data to output the adjusted first confidence level as the second confidence level.

2. The information processing apparatus according to claim 1, wherein
the processor is configured to display the first query in the second display form on the display device when the reliability is less than the threshold value and the first answer is correct.

3. The information processing apparatus according to claim 1, wherein
second arrangement of the plurality of choices on the display device in the second display form is different from first arrangement of the plurality of choices on the display device in the first display form.

4. The information processing apparatus according to claim 3, wherein
the behavior information indicates a change in an eye-gaze position of the user, and
the processor is configured to determine the first confidence level and the reliability based on the first arrangement and the change in the eye-gaze position of the user when the user inputs the first answer.

5. The information processing apparatus according to claim 4, wherein
the processor is configured to determine the second arrangement based on eye-gaze times for which the user gazes at the each of the plurality of choices when the user inputs the first answer.

6. The information processing apparatus according to claim 5, wherein
the processor is configured to determine the second arrangement so that a second choice that is correct from among the plurality of choices is displayed at a position of a first choice having a shortest eye-gaze time from among the plurality of choices in the first display form.

7. The information processing apparatus according to claim 6, wherein
the processor is configured to determine, based on a first eye-gaze time to the first choice, a waiting time until the first query in the second display form is displayed on the display device after the user inputs the first answer.

8. The information processing apparatus according to claim 4, wherein
the processor is configured to
determine, based on the change of the eye-gaze position of the user and a position of the question on the display device in the first display form, a read ratio in which the user reads the first query, and
determine, based on the read ratio, a waiting time until the first query in the second display form is displayed on the display device after the user inputs the first answer.

9. The information processing apparatus according to claim 1, wherein
the processor is configured to arrange a second choice that is correct, based on a position selected by the user previously, when a same position on the display device is repeatedly selected over a plurality of queries.

10. The information processing apparatus according to claim 9, wherein
the processor is configured to arrange the second choice at a previously least selected position.

11. The information processing apparatus according to claim 1, wherein
the processor is configured to obtain the second display form by switching a display position of the question and a display position of the plurality of choices with each other in the first display form.

12. The information processing apparatus according to claim 1, wherein
the processor is configured to obtain the second display form by adding a new choice to the plurality of choices.

13. A method executed by a computer, the computer comprising a display device, a line-of-sight (LOS) detection device mounted close to a periphery of the display device, the LOS detection device being configured to include an infrared light emitting diode (IR-LED) device and an infrared (IR) image sensor device to generate an image to be used for detecting a LOS of a user, and a memory configured to store plural pieces of question data, each of the plural pieces of question data including query data indicating a query sentence and answer data indicating an answer relating to the query sentence, the method comprising:
obtaining first query data from any one of the plural pieces of question data to display the query sentence indicated by the obtained a first query data on the display device in a first display form, the query sentence indicated by the first query data including a question and a plurality of choices, each of the plurality of choices being a selection item to be used for answering to the question;
during the displaying of the query sentence indicated by the first query data, obtaining a measurement result indicating the LOS of the user by measuring a relative position of a first gravity point to a second gravity point, the first gravity point being a gravity point of a pupil detected from the image generated by the IR image sensor device of the LOS detection device, the second gravity point being a gravity point of a Purkinje image detected from the image generated by the IR image sensor device of the LOS detection device;
converting the obtained measurement result to behavior information indicating a change in an eye-gaze position on a screen of the display device by using a reference information indicating a plurality of data pairs each including a respective direction of the LOS and a corresponding eye-gaze position;
in response to receiving an input of a first answer indicating a selection of a first choice being any one of the plurality of choices of the first query data displayed by the first display form, obtain a first confidence level for the received input by inputting a display area of the query sentence indicated by the first query data and the change in the eye-gaze position indicated by the behavior information into a pretrained model, the pretrained model being a machine learning model having been trained by using the display area of the query sentence and the eye-gaze position obtained in advance to output a higher score as a confidence level for an input of an answer is higher;
in response to the first confidence level being less than a threshold value, converting the query sentence indicated by the first query data to a second display form different from the first display form to display the converted query sentence on the display device, the second display form being configured to replace a display position of the first choice indicated by the first answer with a display position of any one of the plurality choices other than the first choice; and
in response to receiving an input of a second answer indicating a selection of any one of the plurality of choices included in the converted query sentence, obtaining a second confidence level by adjusting the first confidence level in accordance with whether the second answer for the first query data is identical to the answer indicated by the answer data corresponding to the first query data,
wherein the adjusting of the first confidence level is configured to
increase the first confidence level in response to the second answer being identical to the answer indicated by the answer data corresponding to the first query data to output the adjusted first confidence level as the second confidence level, and
reduce the first confidence level in response to the second answer being not identical to the answer indicated by the answer data corresponding to the first query data to output the adjusted first confidence level as the second confidence level.

14. The method according to claim 13, wherein
the first query in the second display form is displayed on the display device when the reliability is less than the threshold value and the first answer is correct.

15. The method according to claim 13, wherein
second arrangement of the plurality of choices on the display device in the second display form is different from first arrangement of the plurality of choices on the display device in the first display form.

16. The method according to claim 15, wherein
the behavior information indicates a change in an eye-gaze position of the user, and
the method further comprises
determining the first confidence level and the reliability based on the first arrangement and the change in the eye-gaze position of the user when the user inputs the first answer.

17. A non-transitory computer-readable storage medium storing a program that causes an information processing apparatus to execute a process, the information processing apparatus including a display device, a line-of-sight (LOS) detection device mounted close to a periphery of the display device, the LOS detection device being configured to include an infrared light emitting diode (IR-LED) device and an infrared (IR) image sensor device to generate an image to be used for detecting a LOS of a user, and a memory configured to store plural pieces of question data, each of the plural pieces of question data including query data indicating a query sentence and answer data indicating an answer relating to the query sentence, the process comprising:
obtaining first query data from any one of the plural pieces of question data to display the query sentence indicated by the obtained first query data on the display device in a first display form, the query sentence indicated by the first query data including a question and a plurality of choices, each of the plurality of choices being a selection item to be used for answering to the question;
during the displaying of the query sentence indicated by the first query data, obtaining a measurement result indicating the LOS of the user by measuring a relative position of a first gravity point to a second gravity point, the first gravity point being a gravity point of a pupil detected from the image generated by the IR image sensor device of the LOS detection device, the second gravity point being a gravity point of a Purkinje image detected from the image generated by the IR image sensor device of the LOS detection device;

converting the obtained measurement result to behavior information indicating a change in an eye-gaze position on a screen of the display device by using a reference information indicating a plurality of data pairs each including a respective direction of the LOS and a corresponding eye-gaze position;

in response to receiving an input of a first answer indicating a selection of a first choice being any one of the plurality of choices of the first query data displayed by the first display form, obtain a first confidence level for the received input by inputting a display area of the query sentence indicated by the first query data and the change in the eye-gaze position indicated by the behavior information into a pretrained model, the pretrained model being a machine learning model having been trained by using the display area of the query sentence and the eye-gaze position obtained in advance to output a higher score as a confidence level for an input of an answer is higher;

in response to the first confidence level being less than a threshold value, converting the query sentence indicated by the first query data to a second display form different from the first display form to display the converted query sentence on the display device, the second display form being configured to replace a display position of the first choice indicated by the first answer with a display position of any one of the plurality choices other than the first choice; and in response to receiving an input of a second answer indicating a selection of any one of the plurality of choices included in the converted query sentence, obtaining a second confidence level by adjusting the first confidence level in accordance with whether the second answer for the first query data is identical to the answer indicated by the answer data corresponding to the first query data, wherein the adjusting of the first confidence level is configured to increase the first confidence level in response to the second answer being identical to the answer indicated by the answer data corresponding to the first query data to output the adjusted first confidence level as the second confidence level, and reduce the first confidence level in response to the second answer being not identical to the answer indicated by the answer data corresponding to the first query data to output the adjusted first confidence level as the second confidence level.

18. The non-transitory computer-readable storage medium according to claim 17, wherein the first query in the second display form is displayed on the display device when the reliability is less than the threshold value and the first answer is correct.

19. The non-transitory computer-readable storage medium according to claim 17, wherein second arrangement of the plurality of choices on the display device in the second display form is different from first arrangement of the plurality of choices on the display device in the first display form.

20. The non-transitory computer-readable storage medium according to claim 19, wherein the behavior information indicates a change in an eye-gaze position of the user, and the process further comprises determining the first confidence level and the reliability based on the first arrangement and the change in the eye-gaze position of the user when the user inputs the first answer.

* * * * *